(12) United States Patent
Kadu et al.

(10) Patent No.: US 10,575,028 B2
(45) Date of Patent: Feb. 25, 2020

(54) CODING OF HIGH DYNAMIC RANGE VIDEO USING SEGMENT-BASED RESHAPING

(71) Applicant: Dolby Laboratories Licensing Corporation, San Francisco, CA (US)

(72) Inventors: Harshad Kadu, Santa Clara, CA (US); Qian Chen, San Jose, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/324,468

(22) PCT Filed: Sep. 11, 2017

(86) PCT No.: PCT/US2017/050980
§ 371 (c)(1),
(2) Date: Feb. 8, 2019

(87) PCT Pub. No.: WO2018/049335
PCT Pub. Date: Mar. 15, 2018

(65) Prior Publication Data
US 2019/0349607 A1 Nov. 14, 2019

Related U.S. Application Data

(60) Provisional application No. 62/385,307, filed on Sep. 9, 2016.

(30) Foreign Application Priority Data

Sep. 9, 2016 (EP) .................................... 16187983

(51) Int. Cl.
*H04N 11/02* (2006.01)
*H04N 19/98* (2014.01)
(Continued)

(52) U.S. Cl.
CPC ........... *H04N 19/98* (2014.11); *H04N 19/124* (2014.11); *H04N 19/142* (2014.11); *H04N 19/172* (2014.11)

(58) Field of Classification Search
CPC ...................................................... H04N 19/98
(Continued)

(56) References Cited

U.S. PATENT DOCUMENTS 7,508,981 B2 * 3/2009 Park ..................... G06F 13/40
382/166
8,811,490 B2 8/2014 Su
(Continued)

FOREIGN PATENT DOCUMENTS

WO 2008/153525 12/2008
WO 2014/160705 10/2014
WO 2016/14954 9/2016

OTHER PUBLICATIONS

Minoo (Arris) K. et al., "Description of the reshaper parameters derivation process in ETM reference software", 23 JCT-VC Meeting, Feb. 19, 2016 to Feb. 26, 2016, San Diego (Joint Collaborative team on video coding of ISO/IEC JTCI/SC29/WG11 ABD UTY-T SG, 16) URL: http://wftp3.itu.int/av-arcg/hctvc-site/,, No. JCTVE-WOO31, Jan. 11, 2016, XPO30117798, Sections 2 and 3.1.
(Continued)

*Primary Examiner* — Leron Beck

(57) ABSTRACT

Given HDR and SDR video inputs representing the same content, segment-based methods are described to generate a backward-compatible reshaped SDR video which preserves the artistic intent or "look" of the inputs and satisfies other coding requirements. For each frame in a segment, reshaping functions are generated based on a support frames set determined based on a sliding window of frames that is adjusted based on scene cuts in the segment and which may include frames from both the current segment and neigh-
(Continued)

boring segments. For luma reshaping, a mapping that preserves the cumulative density function of the luminance histogram values in the EDR and SDR inputs is combined with a minimum codeword allocation derived based on the EDR signal and the support frame set. For chroma reshaping, methods for segment-based forward and backward reshaping using multivariate, multi-regression models are also presented.

18 Claims, 6 Drawing Sheets

(51) Int. Cl.
*H04N 19/172* (2014.01)
*H04N 19/124* (2014.01)
*H04N 19/142* (2014.01)

(58) Field of Classification Search
USPC .................................. 375/240.01–240.29
See application file for complete search history.

(56) References Cited

U.S. PATENT DOCUMENTS

| | | | | |
|---|---|---|---|---|
| 8,866,975 | B1* | 10/2014 | Chen | H04N 19/36 345/590 |
| 9,076,224 | B1* | 7/2015 | Shah | G06T 5/009 |
| 10,032,262 | B2 | 7/2018 | Kheradmand | |
| 2002/0196470 | A1* | 12/2002 | Kawamoto | G06T 3/4023 358/3.06 |
| 2007/0104378 | A1* | 5/2007 | Aguera Y Arcas | G06K 9/00476 382/232 |
| 2008/0137990 | A1* | 6/2008 | Ward | H04N 19/30 382/299 |
| 2009/0027558 | A1* | 1/2009 | Mantiuk | H04N 1/6027 348/673 |
| 2010/0157078 | A1* | 6/2010 | Atanassov | G06T 5/007 348/222.1 |
| 2010/0172411 | A1* | 7/2010 | Efremov | H04N 19/136 375/240.12 |
| 2011/0243473 | A1* | 10/2011 | Chen | G06T 5/007 382/274 |
| 2011/0292992 | A1* | 12/2011 | Sirivara | H04N 21/23418 375/240.01 |
| 2012/0314944 | A1* | 12/2012 | Ninan | H04N 19/647 382/166 |
| 2013/0003086 | A1* | 1/2013 | Mebane | H04N 1/6027 358/1.9 |
| 2013/0076763 | A1* | 3/2013 | Messmer | H04N 1/6058 345/506 |
| 2013/0076974 | A1* | 3/2013 | Atkins | H04N 5/235 348/362 |
| 2013/0308027 | A1* | 11/2013 | Jenkin | H04N 5/347 348/302 |
| 2013/0321671 | A1* | 12/2013 | Cote | H04N 5/365 348/241 |
| 2014/0022460 | A1* | 1/2014 | Li | G06T 5/009 348/708 |
| 2014/0241418 | A1* | 8/2014 | Garbas | H04N 19/176 375/240.02 |
| 2014/0267822 | A1* | 9/2014 | Roffet | H04N 5/225 348/222.1 |
| 2016/0156965 | A1* | 6/2016 | Oh | H04N 19/46 725/116 |
| 2018/0007356 | A1 | 1/2018 | Kadu | |
| 2018/0041759 | A1 | 2/2018 | Froehlich | |

OTHER PUBLICATIONS

Lu, Taoran et al., "Implication of high dynamic range and wide color gamut content distribution", Optomechatronic MICRO/NANO Devices and Components 1 1 1 8—Oct. 10, 2007, Lausanne, Switzerland; Proceedings of SPIE , ISSN SPIE, Bellingham, Wash, vol. 9599, Sep. 22, 2015 (Sep. 22, 2015) , pp. 95990B-95990B, XP060060853, DOI : 10.1117/12.2188572 ISBN: 978-1-62841-730-2 section 4.2.

Bayon, D. et al., "Response to Call for Evidence for HDR and WCG Video Coding: Arris, Dolby and InterDigital", 112. MPEG Meeting; Jun. 22, 2015- Jun. 26, 2015; Warsaw; (Motion Picture Expert Group or ISO/IEC JTC1/SC29/WG11), No. m36264, Jun. 23, 2015 (Jun. 23, 2015) , XP030064632, section 2.3.

Bozoki, S. et al., "Scene Adaptive Rate Control in a Distributed Parrallel MPGE CIDEO Encoder", Proceedings of the International Conference on Image Processing. ICIP 1997. Santa Barbara, CA, Oct. 26-29, 1997; [Proceedings of the International Conference on Image Processing] , Los Alamitos, CA : IEEE, US, vol . 2, Oct. 26, 1997 (Oct. 26, 1997) , pp. 780-783, XP002145906, ISBN: 978-0-8186-8184-4.

Pu, F. et al., "Coments on Reshaping for HDR/WCG compression", 113. MPEG Meeting; Oct. 19, 2015 to Oct. 23, 2015; Geneva; (Motion Picture Expert Group or ISO/IEC No. m37267, Oct. 21, 2015 (Oct. 21, 2015) , XP030065635 , sections 2.1.

Jung, C. et al., "CE2-related: Adaptive Quantization-Based HDR video Coding with HEVC Main 10 Profile" , 23. OCT-VC Meeting; Feb. 19, 2016 to Feb. 26, 2016, San Diego; (Joint Collaborative Team on Video Coding of ISO/IEC JTC1/SC29/WG11 and ITU-T SG.16 URL: http://wftp3.itu.int/av-arch/jctvc-site/, No. JCTVC-W0068, Feb. 9, 2016 (Feb. 9, 2016) , XP030117842, section 2.

ITU-R Recommendation ITU-R BT.1886 "Reference Electro-Optical Transfer Function for Flat Panel Displays Used in HDTV Studio Production" Mar. 2011, pp. 1-7.

SMPTE 2084:2014 "High Dynamic Range Electro-Optical Transfer Function of Mastering Reference Displays" Aug. 16, 2014.

* cited by examiner

CODING OF HIGH DYNAMIC RANGE VIDEO USING SEGMENT-BASED RESHAPING

CROSS-REFERENCES TO RELATED APPLICATIONS

This application claims priority U.S. Provisional Application No. 62/385,307 and European Patent Application No. 16187983.8 both filed on Sep. 9, 2016 and both of which are incorporated by references in their entirety.

TECHNOLOGY

The present invention relates generally to images. More particularly, an embodiment of the present invention relates to the coding of video signals with high dynamic range using segment-based reshaping.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

A reference electro-optical transfer function (EOTF) for a given display characterizes the relationship between color values (e.g., luminance) of an input video signal to output screen color values (e.g., screen luminance) produced by the display. For example, in Ref.[1], ITU Rec. BT. 1886 defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 (Ref.[2]). In general, without limitation, the methods of the present disclosure relate to any dynamic range higher than SDR.

As used herein, the term "reshaping" refers to a pre-processing operation on an HDR image, such as scaling, quantization, and the like, to map it from its original bit depth to an image of the same or lower bit depth, to allow for more efficient coding using existing coding standards and devices. 'Forward reshaping' parameters used by an encoder may be communicated to a receiver as part of the coded bitstream using metadata so that a compliant decoder may apply an 'inverse' or 'backward reshaping' operation to reconstruct the original signal at its full dynamic range. Reshaping may be applied to any one or all of the color components of an HDR signal. In some embodiments, reshaping may also be constrained by the requirement to preserve on the decoded image the artistic intent of the original, for example, in terms of the accuracy of colors or "look," as specified by a colorist under the supervision of the director.

Existing reshaping techniques are typically scene-based. As used herein, the term "scene" for a video sequence (a sequence of frames/images) may relate to a series of consecutive frames in the video sequence sharing similar luminance, color and dynamic range characteristics. Scene-based methods work well in video-workflow pipelines which have access to the full scene; however, it is not unusual for content providers to use cloud-based multiprocessing, where, after dividing a video stream into segments, each segment is processed independently by a single computing node in the cloud. As used herein, the term "segment" denotes a series of consecutive frames in a video sequence. A segment may be part of a scene or it may include one or more scenes. Thus, processing of a scene may be split across multiple processors. To improve existing coding schemes, as appreciated by the inventors here, improved techniques for segment-based reshaping of HDR video are needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
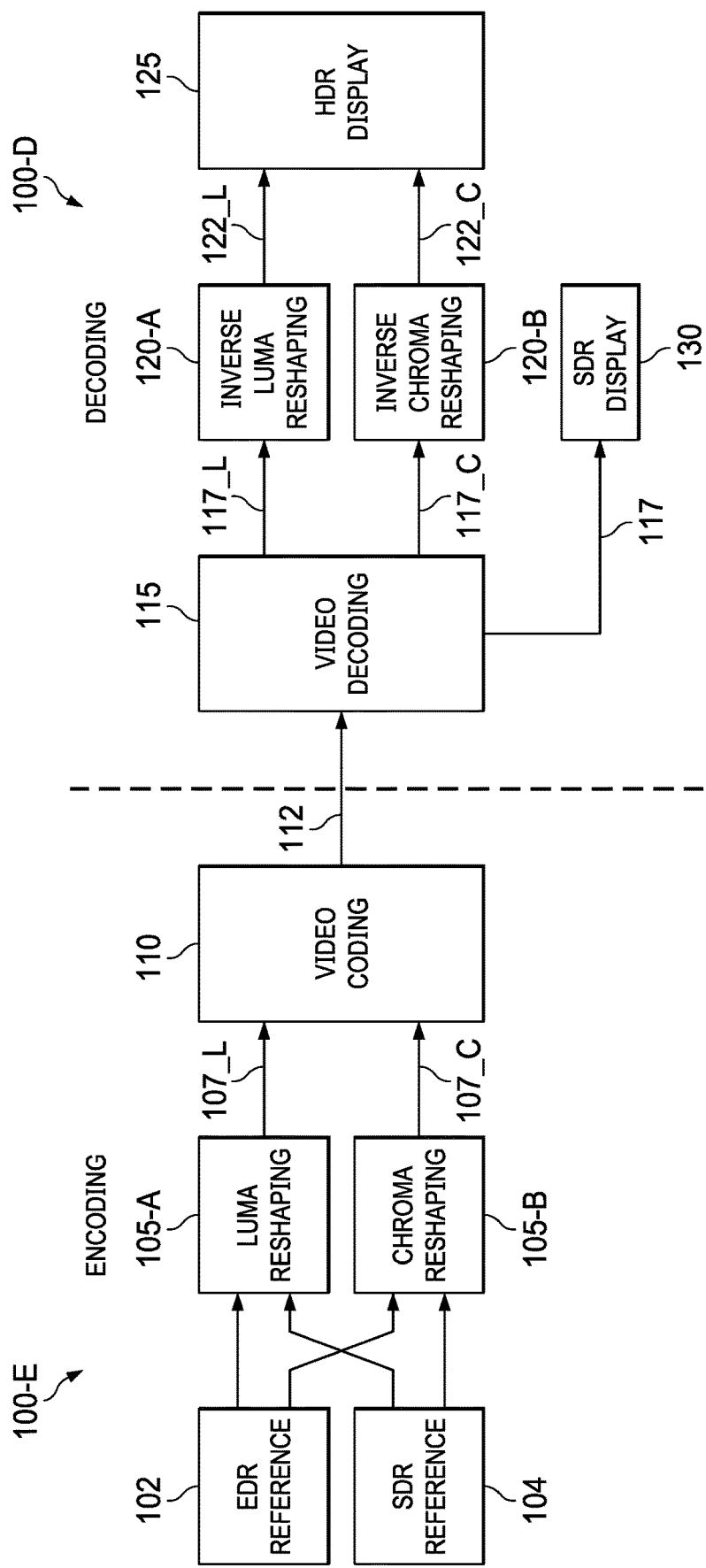
FIG. 1 depicts an example process for data compression using reshaping according to an embodiment of this invention.

Segment-based reshaping techniques for high dynamic range (HDR) images are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to segment-based signal reshaping, e.g., reshaping of HDR images. The reshaping may relate to or comprise luma and/or chroma reshaping. The reshaping may also be said to relate to generating a forward luma reshaping mapping. In one aspect, a processor for segment-based reshaping receives a first input video signal in a first dynamic range and a second input video signal in a second dynamic range, wherein corresponding frames in the first signal and the second signal represent the same image, wherein the first dynamic range is higher than the second dynamic range. The first input video signal and the second input video signal are divided into consecutive segments, wherein each segment comprises primary frames and padded frames, wherein padded frames for a segment overlap with the primary frames of at least one neighboring segment. The primary frames are those frames for which a forward luma reshaping mapping is to be generated in a computing node. The padded frames are arranged in the segment before a first one of the primary frames and/or after a last one of the primary frames. Different segments may be processed independently from each other, for example by different computing nodes. In the computing node, for luma reshaping, for a primary frame in a segment of the first input video, the node computes a support frame set based on a sliding window centered on the primary frame and adjusted based on scene cuts in the segment. The support frame set may be obtained by adjusting the sliding window based on the scene cuts in the segment. For example, frames of the sliding window that are not contained in the same scene as the primary frame (the scene being bounded by the scene cuts) may be excluded from the support frame set. The support frame set may include, depending on a position of the primary frame within the segment, padded frames in addition to (other) primary frames. Thereby, the forward luma reshaping mapping for such primary frame may be based also on the statistics (e.g., luma histograms, noise measurements, etc.) of padded frames, thereby offering better (smoother) transitions between forward luma reshaping mappings at transitions from one segment to another. The computing node determines a minimum codeword allocation for luminance pixel values in a reshaped frame of the primary frame based on a first reshaping method and the support frame set, and it determines a first mapping for luminance values of the primary frame from the first dynamic range to the second dynamic range based on a second reshaping method that preserves the artistic "look" of the input video signals. It combines the first mapping with the minimum codeword allocation to generate a final forward luma reshaping mapping, and applies the final luma reshaping mapping to luminance pixel values of the primary frame to generate luminance pixel values of an output reshaped frame.

In some embodiments, the minimum codeword allocation may be determined based on a noise masking threshold for the primary frame. The noise masking threshold may be determined based on the frames of the support frame set for the primary frame. For example, the noise masking threshold may be determined based on noises measurements for the frames of the support frame set, e.g., by averaging the noise measurements over the frames of the support frame set. The noise measurements may be based on block-based standard deviations of luma values in respective frames. These block-based standard deviations may be averaged for each of a plurality of luma bins. In some embodiments, the minimum codeword allocation may indicate a lower bound on an allocation of output codewords in the reshaped frame across input codewords in the primary frame. That is, the minimum codeword allocation may indicate for each pair of adjacent codewords in the primary frame a required amount of codewords in the reshaped frame.

In some embodiments, computing the support frame set may comprise: determining a window of 2 W+1 frames centered on the primary frame; determining a first scene cut in the segment nearest to the left of the primary frame; determining a second scene cut in the segment nearest to the right of the primary frame; adjusting the left side of the window to be the beginning of the first scene cut in the segment, if the position of the first scene cut is within W frames to the left of the primary frame; and adjusting the right side of the window to be the frame before the position of the second scene cut in the segment, if the position of the second scene cut is within W frames to the right of the primary frame, where W is an integer.

In some embodiments, determining the minimum codeword allocation based on a first reshaping method may comprise: partitioning the luminance range of the primary frame into non-overlapping bins; generating noise estimates for each bin based on a noise measuring criterion and the support frame set; and generating the minimum codeword allocation based on the input bit depth of the first input, a target bit depth for the reshaped frame, and a function for mapping noise estimates to bit depths (e.g., a masking-noise to bit depth function).

In some embodiments, the second reshaping method may generate the first mapping by matching histogram characteristics of luminance values in a mapped frame to the histogram characteristics of luminance values in a frame in the second video signal corresponding to the primary frame, wherein the mapped frame is generated by applying the first mapping to the primary frame. That is, the second reshaping method may generate the first mapping so that histogram characteristics of luminance values in a mapped frame match the histogram characteristics of luminance values in a frame in the second video signal corresponding to the primary frame, wherein the mapped frame is generated by applying the first mapping to the primary frame.

In some embodiments, determining the first mapping for mapping luminance values of the primary frame from the first dynamic range to the second dynamic range based on a second reshaping method may comprises computing based on the support frame set a first normalized luminance histogram for the primary frame (e.g., computing based on the support frame set a first normalized luminance histogram for the primary frame); computing a first cumulative density function, CDF, (for the primary frame) based on the first normalized luminance histogram(s); computing a second normalized luminance histogram for each frame in the second input video that corresponds to a frame in the support frame set (e.g., computing based on the support frame set a second normalized luminance histogram for the frame in the second input video corresponding to the primary frame); computing a second CDF based on the second normalized luminance histogram(s); and for each luma intensity value in the primary frame determining a first mapped luma value such that the output value of the first CDF for the luma intensity value is approximately equal to the output value of the second CDF for the first mapped luma value.

In some embodiments, combining the first mapping with the minimum codeword allocation may comprise: generating delta values based on pair-wise differences of consecutive codewords in the first mapping (e.g., generating, as delta values, pair-wise differences between mapped codewords of consecutive codewords, the consecutive codewords being mapped by the first mapping); identifying a first set of elements of the delta values which violate the minimum codeword allocation requirements (e.g., delta values which are below a minimum number of required codewords given by the minimum codeword requirement); determining a first metric ($\alpha$) of codeword requirements to be added for the first set of elements; identifying a second set of elements of the delta values which do not violate the minimum codeword allocation requirements (e.g., delta values which are not below a minimum number of required codewords given by the minimum codeword requirement); determining a second metric ($\beta$) of codeword requirements to be subtracted for the second set of elements; for the first set of elements, replacing their delta values with their corresponding minimum codeword allocation requirements values; for the second set of elements, rescaling their delta values based on the first metric and the second metric; and generating a forward reshaping LUT based on the updated values of the first set of elements and the second set of elements. The first metric may indicate an additional amount of required codewords for satisfying the minimum codeword allocation requirements. The second metric may indicate a sum of those delta values that do not violate the minimum codeword allocation requirements. In some embodiments, rescaling may comprise multiplying each original delta value in the second set of elements by $$\left(1 - \frac{\alpha}{\beta}\right).$$

In some embodiments, the method may further comprise determining forward luma reshaping mappings for two or more of the frames belonging to the support frame set of the primary frame; and determining an average forward luma reshaping mapping based on an average or weighted average of the forward luma reshaping mappings for the two or more frames in the support frame set of the primary frame.

In some embodiment, the method may further comprise applying the forward luma reshaping mapping or the average forward luma reshaping mapping for the primary frame to the luminance pixel values of the primary frame to generate luminance values of an output reshaped frame.

For chroma reshaping, the computing node determines a forward set of reshaping chroma parameters (e.g., a set of reshaping chroma parameters for forward chroma reshaping) based on a forward multivariate, multi-regression model (MMR) and a forward support frame set (e.g., a support frame set for forward chroma reshaping), such that the mean-square error between chroma values in the output reshaped frame and chroma values in the corresponding frame of the second input video is minimized (e.g., by minimizing the mean-square error between chroma values in the output reshaped frame and chroma values in the corresponding frame of the second input video). In addition, the node determines a backward set of reshaping chroma parameters (e.g., a set of reshaping chroma parameters for backward chroma reshaping) based on a backward MMR model and a backward support frame set (e.g., a support frame set for backward chroma reshaping), such that the mean-square error between chroma values in the reconstructed frame in the first dynamic range and chroma values in the corresponding primary frame is minimized (e.g., by minimizing the mean-square error between chroma values in the reconstructed frame in the first dynamic range and chroma values in the corresponding primary frame). The forward MMR model is applied to the primary frame to generate chroma pixel values in the output reshaped frame, and the backward MMR model parameters are communicated downstream to a decoder as metadata.

In some embodiments, the MSE error may be weighted MSE. In some embodiments, the method may further comprise applying the forward MMR model to the primary frame to generate chrominance values of the output reshaped frame. Another aspect relates to an apparatus comprising a processor and being configured to perform any one of the methods recited above. Yet another aspect relates to a non-transitory computer-readable storage medium having stored thereon computer-executable instruction for executing any one of the methods recited above.

Example Video Delivery Processing Pipeline
Signal Reshaping

Currently, most digital interfaces for video delivery, such as the Serial Digital Interface (SDI), are limited to 12 bits per pixel per component. Furthermore, most practical implementations of compression standards, such as H.264 (or AVC) and H.265 (or HEVC), are limited to 10-bits per pixel per component. Therefore efficient encoding and/or quantization is required to support HDR content, with dynamic range from approximately 0.001 to 10,000 cd/m² (or nits), within existing infrastructures and compression standards.

The term "PQ" as used herein refers to perceptual luminance amplitude quantization. The human visual system responds to increasing light levels in a very non-linear way. A human's ability to see a stimulus is affected by the luminance of that stimulus, the size of the stimulus, the spatial frequencies making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. An example PQ mapping function is described in SMPTE ST 2084:2014 (Ref.[2]), where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve imitates the true visual response of the human visual system using a relatively simple functional model. For example, under SMPTE ST 2084, at 1 cd/m², one 12-bit code value corresponds to a relative change of approximately 0.0048 cd/m²; however, at 1,000 cd/m², one 12-bit code value corresponds to a relative change of approximately 2.24 cd/m². This non-linear quantization is needed to accommodate for the non-linear contrast sensitivity of the human visual system (HVS)

FIG. 1 depicts an example process (100) for data compression and decompression using luma and chroma reshaping according to an embodiment of this invention. In an encoder (100-E), a video sequence may be available in both high dynamic range (EDR, 102) and standard dynamic range (SDR, 104) formats. In some embodiments, the SDR sequence may be generated based on the EDR sequence. In other embodiments, the EDR sequence may be generated based on the SDR sequence. In an embodiment, the "look" in both the input EDR and SDR sequences (as represented by their luminance and color pixel values) represent the artistic intent or "look" of the director. Inputs (102) and (104), may be coded according to certain EOTF (e.g., gamma, PQ, and the like).

Forward reshaping may include separate luma reshaping (105-A) and chroma reshaping (105-B) processes. Luma reshaping (105-A) and chroma reshaping (105-B) processes, as will be described herein, may be applied to the input EDR signal (102), taking into consideration the characteristics of the reference SDR signal (104), to generate a reshaped SDR signal (107) with corresponding luma (107-L) and chroma (107-C) components. In some embodiments, forward reshaping (105) may also include processes related to color conversion, tone mapping, and saturation control.

After reshaping, video signal (107) is delivered to encoding block (110) for delivering downstream to decoding and playback devices such as television sets, set-top boxes, movie theaters, and the like. In some embodiments, coding block (110) may include audio and video encoders, such as those defined by ATSC, DVB, DVD, Blu-Ray, and other delivery formats, to generate coded bit stream (112). In a receiver (100-D), the coded bit stream (112) is decoded by decoding unit (115) to generate a decoded signal (117) representing an identical or close approximation of signal (107).

In a backward-compatible SDR decoder, decoded signal (117) may be displayed directly to SDR display (130). In an HDR decoder, following decoding (115), decoded signal (117) may be processed by a backward or inverse reshaping function (120), which converts the reshaped signal back to its original (higher) dynamic range, to be displayed on an HDR display (125). Inverse reshaping may include separate inverse luma reshaping (120-A) and chroma reshaping (120-B). Depending on the transformations of the forward reshaper (105), inverse reshaping (120), may also include additional (inverse) processes, such as inverse tone-mapping, color transformations, and the like. In some embodiments, the backward or inverse reshaping function (120) may be integrated with a de-quantizer in decoder (115), e.g., as part of the de-quantizer in an AVC or HEVC video decoder. In some embodiments, information about the reshaping process (105) may be communicated to downstream devices (such as decoders) using metadata, SEI messaging, and the like.

Luma Reshaping Techniques

Figure 2:
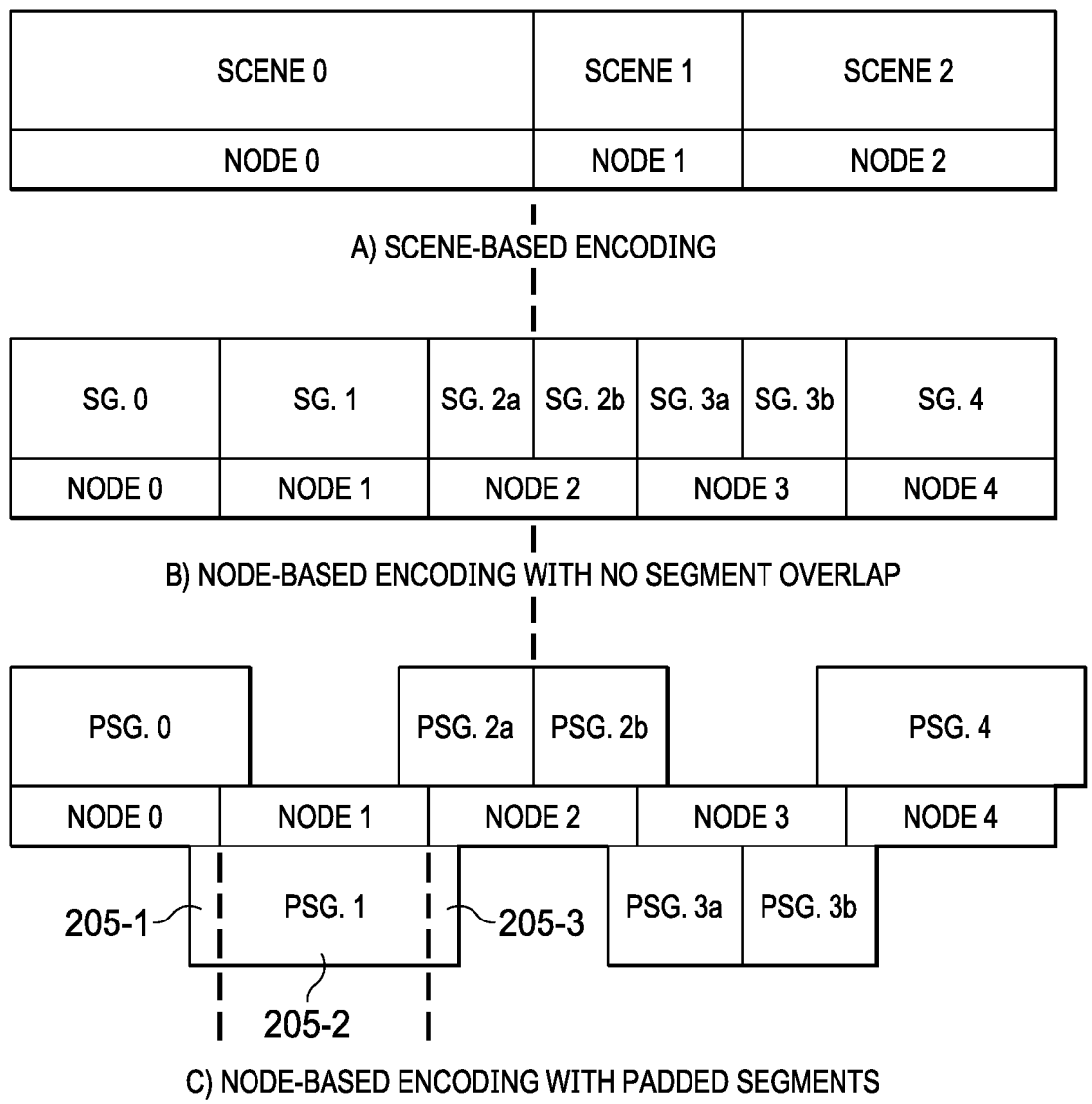
FIG. 2A-2C depict examples of processing video scenes for color reshaping according to an embodiment of this invention.

Given an input video sequence comprising two or more scenes, existing reshaping techniques typically operate on a per-scene basis. That is, the encoder a) collects statistics for each frame within a scene, b) calculates the forward reshaping and backward reshaping functions, and c) applies the reshaping function to the entire scene. This allows an encoder to better manage sudden jumps in the luminance and/or chroma characteristics of the input due to scene changes. An example of such a process is shown in FIG. 2a, where in an example multi-processing system with three computing nodes, each scene (Scene 0 to Scene 2) is processed separately by each node (Node 0 to Node 2). However, in many over-the-top service providers, the encoding farm consists of multiple nodes in a computing cloud, where each node is assigned to encode a fixed interval (segment) of the video for better timing and schedule management. Typical segment sizes range in length between 10 to 30 seconds. For example, at 24 fps, a segment may have a total of 720 frames or pictures. An example of such process is depicted in FIG. 2b, where the three original scenes are now divided into five equal segments (Sg.0 to Sg. 4), wherein each segment is assigned to a separate computing node (Node 0 to Node 4).

As shown in FIG. 2b, a scene (e.g., Scene 0) can cross multiple segments (Sg. 0, Sg.1, and Sg. 2) and a segment (e.g., Sg. 2) can include frames from multiple scenes (e.g., Sg. 2a belongs to Scene 0 and Sg. 2b belongs to Scene 1). In many applications, once the encoding job is dispatched to each node, it is strongly preferred not to pass information between nodes. When a scene is split into multiple segments, an encoder encodes each sub-scene individually, via local optimization. In this scenario, discontinuity in image characteristics (such as a sudden luminance change or a sudden color change) will be observed within this scene.

One approach to address this issue is by using extended or padded segments, where a padded segment may be partially encoded by multiple computer nodes. For example, as depicted in FIG. 2c, in an embodiment, padded segment 0 (Psg.0) may be encoded by both Node 0 and Node 1, and padded segment 1 (Psg. 1) may be encoded by Node 0, Node 1, and Node 2. This approach offers better transition at the boundaries; however, it requires additional encoding computations due to the overlapped encoding and may also require inter-node communications.

In a preferred embodiment, to eliminate any need for inter-node communications, there is no overlapped-encoding; however, reshaping functions are generated based on statistics from extended or padded segments. For example, consider padded segment 1 (205, Psg. 1) in FIG. 2c. This segment includes three parts (or sub-segments): padded frames (205-1), to be encoded by Node 0, primary frames (205-2), to be encoded by Node 1, and padded frames (205-3), to be encoded by Node 2; however, when Node 1 computes a reshaping function to be applied to sub-segment 205-2, it may consider statistics from padded frames belonging to both 205-1 and 205-2 or to both 205-2 and 205-3. This approach allows for a) improving the local statistics based on neighbor segments, and b) applying parallel processing across nodes without passing information between nodes.

Support Frame Set

As discussed earlier, a segment may include one or more scene cuts. In addition, padded segments may include frames from the prior or the subsequent segment to improve the generation of statistical data, such as masking thresholds. In an embodiment, such statistical data are collected within a sliding window centered on the current frame and spanning 2 W+1 frames (e.g., W=15). In an embodiment, if the sliding window covers a scene cut, then frames in the window belonging to another scene may be dropped from this statistics-gathering window. This final window for the j-th frame within the t-th segment will be denoted as the "support frame set" $\Phi_{t,j}$.

Figure 3A:
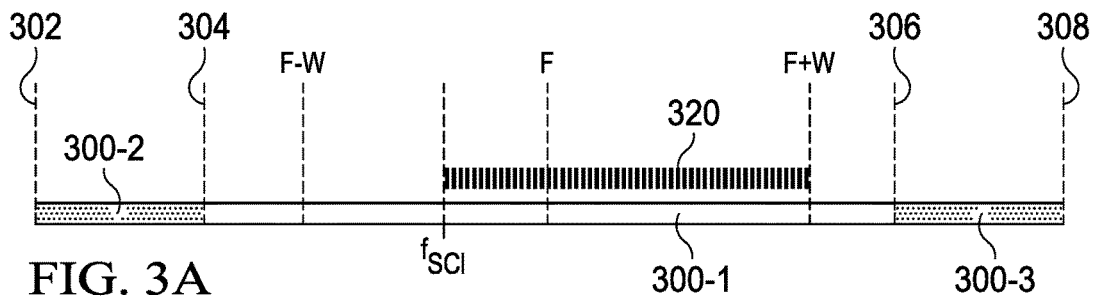
FIG. 3A-3C depict examples of support frame sets according an embodiment of this invention.
Figure 3B:
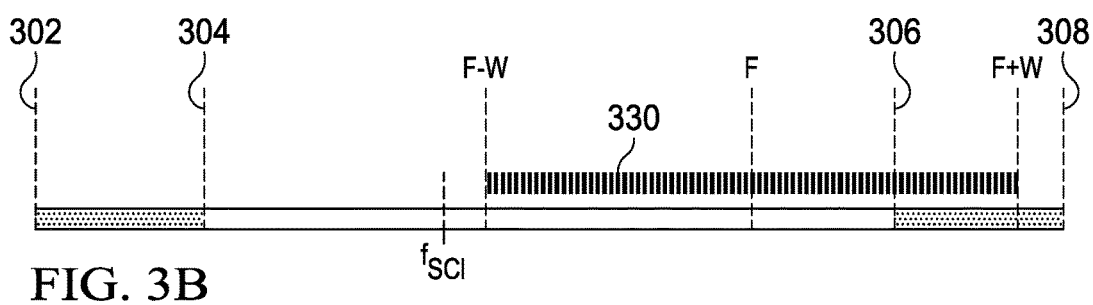
Figure 3C:
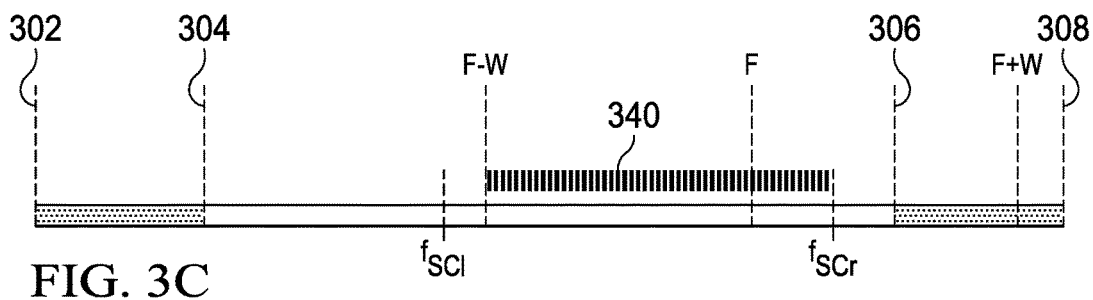

Three examples of support frames sets are depicted in FIG. 3, where the primary frames (300-1) of the coding (or reshaping) segment are between frames (304) and (306) and the padded segment, which includes padded frames (300-2) and (300-3), is defined between frames (302) and (308). Consider a segment t with a total number of frames denoted as $F_t$, e.g., all frames in (300-1), between (304) and (306). Let $f_{SCl}$ denote the beginning of the first scene cut immediately before the current frame F, and let $f_{SCr}$ denote a scene cut immediately after the current frame F. In FIG. 3a, the sliding window (F−W, F+W) goes beyond the left scene cut ($f_{SCl}$), hence, given there is no scene cut to the right, the support frame set (320) is constrained to be within the left scene cut ($f_{SCl}$) and F+W. In FIG. 3b, the left scene cut ($f_{SCl}$) is outside of the sliding window (F−W, F+W), hence the support frame set (330) includes all the frames in the sliding window (F−W, F+W). In FIG. 3c, the right scene cut ($f_{SCr}$) is within the sliding window (F−W, F+W), hence the support frame set (340) is constrained to be within F−W and $f_{SCr}-1$.

In some embodiments the padded areas (e.g., (302) to (304) and (306) to (308)), may also include W frames each, but may also include less than W frames each, depending on the bandwidth constraints.

Consider segment t. For the j-th frame (e.g., F in FIG. 3) in the set of primary frames (e.g. (304) to (306)) in the segment, let $f_{SCl}$ denote the frame for the first scene cut to its left and let $f_{SCr}$ denote the frame for the first scene cut to its right. Let ($f_{P,t}^b$, $f_{P,t}^e$) denote the first and last frames of the extended (padded) segment t (e.g., between frames (302) and (308)), then $$W_{t,j}^b = \max\{f_{P,t}^b, j-Q, f_{SCl}\},$$

and $$W_{t,j}^e = \min\{j+W, f_{SCr}-1, f_{P,t}^e\}, \quad (1)$$

denote the left and right borders of the sliding window for the j-th frame (e.g., (320) or (330)), as constrained by the scene cuts, then the support frame set is given by $$\Phi_{t,j} = \{W_{t,j}^b, W_{t,j}^b+1, W_{t,j}^b+2, \ldots, W_{t,j}^e-2, W_{t,j}^e-1, W_{t,j}^e\}. \quad (2)$$

Codeword Allocation Based on Noise Masking Threshold

As described in Ref.[4] and Ref.[5], the reshaping function may be computed according to a noise mask histogram of the input image so that quantization noise is not perceived by the human observers. For example, denote the p-th pixel at frame j as (p). Denote a noise measurement (e.g., the standard deviation within a block of pixels centered around pixel p) for each pixel as $H_j(p)$. Let $\Omega_j$ denote the set of pixels with valid noise measurement within frame j. Let i be an index inside $\Omega_j$. Therefore, the set of valid standard deviation measurements may be denoted as $$H_j(i), i \in \Omega_j. \quad (3)$$

Next, one may partition the intensity of the input image into M non-overlapping bins (e.g., M=16, 32, or 64) with equal interval $W_b$ (e.g., for 16-bit input data, $W_b$=65,536/M) to cover the whole normalized dynamic range (e.g., (0,1]). Then, one may compute the average standard deviation in each bin as follows. For the m-th bin (where m=0, 1, …, M−1), identify all pixels in the original image, $I_j(i), i \in \Omega_j$, which have the pixel value in the range [m/M, m+1/M). Then, for each bin, compute the average standard deviation for the pixels inside the bin. Denote this average value as $b_{j,m}$. Given $$\Psi_{j,m} = \left\{ i \,\Big|\, \frac{m}{M} \leq I_j(i) < \frac{m+1}{M} \right\}, \quad (4)$$

then, for pixel-based noise estimation, in an embodiment $$b_{j,m} = \max\{H_j(i) | i \in \Psi_{j,m}\}. \quad (5)$$

Similarly, for block-based noise estimation, in an embodiment, $$b_{j,m} = \mathrm{mean}\{H_j(i) | i \in \Psi_{j,m}\}. \quad (6)$$

Next, given the support frame set defined earlier $\Phi_{r,j}$ for each bin m, for pixel-based noise estimation, $$b_m^{(j)} = \min\{b_{f,m} | f \in \Phi_{t,j}\}, \quad (7)$$

and for block-based noise estimation.

$$b_m^{(j)} = \frac{1}{|\Phi_{t,j}|} \sum_{f \in \Phi_{t,j}} b_{f,m}, \quad (8)$$

where, given set X, |X| denotes the number of elements in the set.

Given these noise level estimates, the target bit depth for each bin is computed as $$Q_m^{(j)} = f(b_m^{(j)}), \quad (9)$$

where f(.) is a function for mapping noise estimates to bit depths (masking-noise to bit depth function), typically computed empirically (see Ref.[4]).

Given equation (9), the normalized required codewords may be derived as $$D_m^{(j)} = \left( \frac{2^{Q_m^{(j)}}}{2^{B_T}} \right) / 2^{B_I}, \quad (10)$$

where $B_I$ and $B_T$ denote respectively the input bit depth (e.g., $B_I$=16) and the target output bit-depth (e.g., $B_T$=10). Given (from equation (10)), the required normalized codewords for each bin, the codeword allocation across all input codewords may be derived as:

$$d_i^{(j)} = D_m^{(j)} \text{ for } (m-1)W_b \le i < mW_b.$$ (11)

The set of $\{d_i^{(j)}\}$ values denotes the lower bound of required codewords. Any quantization (reshaping) curve should satisfy this lower bound to avoid generating quantization-related noise artifacts, such as contouring. The total number of normalized codewords for all input codewords, D, is bounded by 1, or $$D = \sum_{i=v_L}^{v_H} d_i^{(j)} \le 1,$$ (12)

where $v_L$ and $v_H$ denote the minimum and maximum pixel values within the frame. If the summation of all $\{d_i^{(j)}\}$ is under the overall codeword budget, then one can assign the unused codewords to improve overall quality of the coded (reshaped) stream.

In many applications, it is very important for any reshaping (105) to preserve the director's artistic intent as expressed by the color grading of the reference EDR (102) and SDR (104) inputs, so that the "look" of the decoded streams (e.g., (117) and (122)) matches, respectively, the look of the input streams (e.g., (104) and (102)). For example, in some embodiments, color grading operations are recorded (e.g., as metadata) as Lift, Gain, and Gamma (LGG), or Slope, Offset, and Power (SOP) operations. As an example, luma reshaping based on the efficient matching of luma histograms is described in Ref[6]. Without limitation, an alternative method, based on matching cumulative distribution functions (CDF) is also presented herein.

CDF-Based Matching

In an embodiment, the ultimate goal is to match the luma looks between the reference SDR (104) and the mapped sequence (107). In other words, an EDR to SDR luma reshaping function (105-A) should produce a mapped SDR image (107-L) that has luma histogram distribution similar to that of the reference SDR. In an embodiment, instead of working in the histogram domain directly, it is more efficient to use the cumulative sums or CDFs of these histograms to find the luma reshaping function.

Let's denote the normalized reference SDR and EDR histograms for frame j with $h_j^s(m)$ and $h_j^v(m)$, where m is the bin index. Then, their corresponding CDF functions, $c_j^s(b)$ and $c_j^v(b)$, may be generated as $$c_j^s(b) = \sum_{m=0}^{b} \left( \frac{1}{|\Phi_{t,j}|} \sum_{f \in \Phi_{t,j}} h_f^s(m) \right),$$ (13)

$$c_j^v(b) = \sum_{m=0}^{b} \left( \frac{1}{|\Phi_{t,j}|} \sum_{f \in \Phi_{t,j}} h_f^v(m) \right).$$

Figure 4:
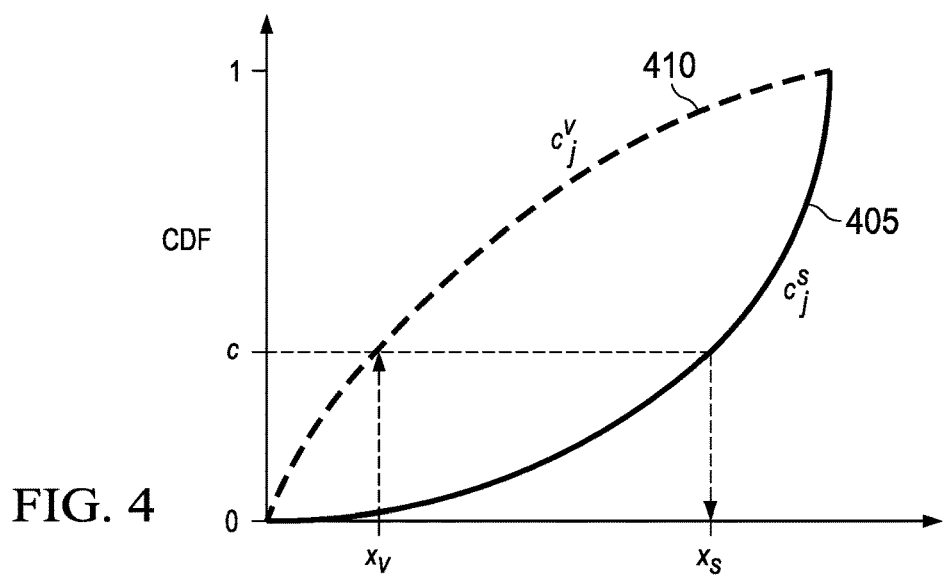
FIG. 4 depicts an example of EDR to SDR luma reshaping using CDF matching according to an embodiment of this invention.

As an example, FIG. 4 depicts examples of the $c_j^v(.)$ (410) and $c_j^s(.)$ (405) CDFs for normalized input codewords and normalized CDF values in (0, 1).

Consider a luma reshaping function which produces a look-up table (LUT) $\{l_i^{(j)}\}$ for each frame j. This LUT represents a mapping from EDR luma intensity $x_v$ to SDR luma intensity $x_s$ i.e. $R_j(x_v) \to x_s$. To find the mapped SDR value $x_s$ for EDR luma intensity $x_v$, based on matching the CDF, the following process, as depicted in FIG. 4, is applied: a) Given an EDR value $x_v$, a value c is determined so that the corresponding $c_j^v(x_v) = c$. b) Given c, the value of SDR intensity $x_s$ that has the same CDF value (i.e., $c_j^s(x_s) = c$) is the mapped SDR value for $x_v$. This yields the equality $c_j^s(x_s) = c_j^v(x_v) = c$. This process may be repeated for all possible $x_v$ codewords in the j-th frame to generate the $\{l_i^{(j)}\}$ mapping. Then, in an embodiment, the CDF-based luma reshaping function M(.) can be expressed as:

$$\{l_i^{(j)}\} = M(c_j^s, c_j^v).$$ (14)

That is, the luma reshaping function is determined based on the first CDF and the second CDF.

In practical implementations, the CDF curves will be stored as discrete values. For such cases, if the value c is not present in $c_j^s$, then known interpolation techniques, such as linear interpolation, may be employed to generate the mapped value $x_s$.

Let $T_i^{(j)}$ denote a forward LUT which is obtained by merging together the CDF based luma reshaping LUT $\{l_i^{(j)}\}$ (e.g., as expressed by equation (14)) and the required codeword lower bound $\{d_i^{(j)}\}$ (e.g., see equation (11)). An example of generating $T_i^{(j)}$ is presented next.

As explained earlier, the final forward reshaping mapping is a combination of a) codeword allocation based on applying masking noise thresholds to collected noise characteristics of the input EDR signals and b) an EDR to SDR mapping that preserves the director's intent or "look." In an embodiment, the two results may be combined as follows.

Given the $\{l_i^{(j)}\}$ LUT, $\Delta l_i^{(j)} = l_{i+1}^{(j)} - l_i^{(j)}$, e.g., pair-wise differences between the SDR output values corresponding to two consecutive input EDR codewords, provides a simple metric for the allocation of codewords in $\{l_i^{(j)}\}$. If $\Delta l_i^{(j)} > d_i^{(j)}$, then $l_i^{(j)}$ satisfies both the lower bound and the color matching requirements and no further action is needed; if not, the lower bound requirement has priority and the $\Delta l_i^{(j)}$ values will need to be adjusted as needed. In an embodiment, such an adjustment is made by subtracting codewords from those symbols where there are more than needed, e.g., when $\Delta l_i^{(j)} > d_i^{(j)}$.

Let $\{\eta_i^{(j)}\}$ denote a temporary LUT, initialized to zero, where one will generate updated $\{\Delta l_i^{(j)}\}$ values which meet both the lower bound and the color matching requirement. Given $\{\eta_i^{(j)}\}$, the Final forward reshaping LUT (FLUT) will be given by $$T_i^{(j)} = \sum_{m=0}^{i} \eta_m^{(j)}.$$ (15)

For the j-th frame, let violations due to codeword allocation thresholds be denoted as a set of indices $\Im^{(j)}$. That is, let $$\Im^{(j)} = \{i | \Delta l_i^{(j)} \le d_i^{(j)}\} \ \forall i \in [v_L^{(j)}, v_H^{(j)}].$$ (16)

The violation amount for each of these indices in the set $\Im^{(j)}$ is added up to get the total of extra or additional amount of codewords required ($\alpha$).

$$\alpha = \sum_{i \in \Im^{(j)}} (d_i^{(j)} - \Delta l_i^{(j)}).$$ (17)

These additional codewords may be extracted from the bins $\aleph^{(j)}$ which do not violate the lower bound requirements. Let $\beta$ denote the sum of codewords in the set $\aleph^{(j)}$:

$$\aleph^{(j)} = \{i \mid \Delta l_i^{(j)} > d_i^{(j)}\} \; \forall \; i \in [v_L^{(j)}, v_H^{(j)}], \quad (18)$$

$$\beta = \sum \Delta l_i^{(j)}. \quad (19)$$

Codeword allocation in the bins that violate the lower bound constraints is replaced with lower codeword allocation bounds; that is:

$$\eta_i^{(j)} = d_i^{(j)}, \text{ for all } i \in \aleph^{(j)}. \quad (20)$$

Codeword allocation in the bins which do not violate the lower bound is rescaled to keep the number of codewords constant.

$$\eta_i^{(j)} = \Delta l_i^{(j)} \times \left(1 - \frac{\alpha}{\beta}\right) \text{ for all } i \in \aleph^{(j)}. \quad (21)$$

With these changes, there is a possibility of having lower bound violation in bins where there were no violations before. So, given the updated $\{\eta_i^{(j)}\}$, the merging process may be repeated again until the lower bound is satisfied. In some embodiments, after convergence, the entries in the FLUT (e.g., from equation (15)) may be smoothened with an averaging filter and rescaled to maintain the overall codeword budget.

If the overall codeword budget is not enough to satisfy both the lower bound constrains and the M(.) mapping, then the M(.) mapping may be bypassed and one may use only the codewords generated from the original lower bound requirements.

Denote as $FLUT_{t,j}(v_{t,j,p}^Y)$ a smoothed (filtered) version of the forward reshaping LUT $T_i^{(j)}$ for the j-th frame in the t-th segment, defining the output luma value for the p-th EDR pixel value $v_{t,j,p}^Y$. In an embodiment, given the support frame set $\Phi_{t,j}$, the j-th frame may be selected to be mapped using the average FLUT (say, $\overline{FLUT}$), using an average or a weighted average of the individual FLUT mappings. For example, when averaging:

$$\overline{FLUT}_{t,j}(v_{t,j,p}^Y) = \sum_{k \in \Phi_{t,j}} \frac{FLUT_{t,k}(v_{t,k,p}^Y)}{|\Phi_{t,j}|}. \quad (22)$$

Segment-Based Chroma Reshaping
Non-Overlapping Solution—Forward Reshaping

Before addressing solutions related to overlapped (or padded) segments, this section will introduce some notation to be carried out to the rest of this specification. Let $$u_{t,j,p} = \begin{bmatrix} v_{t,j,p}^Y \\ v_{t,j,p}^{Cb} \\ v_{t,j,p}^{Cr} \end{bmatrix},$$

denote the original normalized value (e.g., in (0,1]) for the p-th pixel of frame j within segment t in the EDR reference signal (102). In an embodiment, chroma reshaping may be based on a multivariate, multiple regression (MMR) representation. Examples of such MMR predictors may be found in U.S. Pat. No. 8,811,490 (Ref.[3]). For example, in an embodiment, using a second order with cross-products MMR representation, the vector $\overline{u}_{t,j,p}^T$ may be expressed as $$\overline{u}_{t,j,p}^T = [1 \; v_{t,j,p}^Y \; v_{t,j,p}^{Cb} \; v_{t,j,p}^{Cr} \; (v_{t,j,p}^Y)^2 \\
(v_{t,j,p}^{Cb})^2 (v_{t,j,p}^{Cr})^2 \; (v_{t,j,p}^Y v_{t,j,p}^{Cb}) \\
(v_{t,j,p}^Y v_{t,j,p}^{Cr})(v_{t,j,p}^{Cb} v_{t,j,p}^{Cr})(v_{t,j,p}^Y)^2 \\
(v_{t,j,p}^{Cb})^2 (v_{t,j,p}^Y)^2 (v_{t,j,p}^{Cr})^2 (v_{t,j,p}^{Cb})^2 \\
(v_{t,j,p}^{Cr})^2 \; (v_{t,j,p}^Y v_{t,j,p}^{Cb} v_{j,p}^{Cr}) \\
(v_{t,j,p}^Y v_{t,j,p}^{Cb} v_{t,j,p}^{Cr})^2]. \quad (23)$$

In equation (23), in some embodiments, some terms may be removed to reduce the computational load. For example, one may use in the model only one of the chroma components or one may eliminate completely certain high-order cross components. In a 3-d order MMR with cross products, the following additional terms of $\overline{u}_{ex}$ may be appended to $\overline{u}_{t,j,p}$:

$$u_{ex}^T [(v_{t,j,p}^Y)^3 (v_{t,j,p}^{Cb})^3 (v_{t,j,p}^{Cr})^3 \quad (v_{t,j,p}^Y)^3 \\
(v_{t,j,p}^{Cb})^3 \\
(v_{t,j,p}^Y)^3 (v_{t,j,p}^{Cb} v_{t,j,p}^{Cb})^3 (v_{t,j,p}^{Cr})^3 \\
(v_{t,j,p}^Y \; v_{t,j,p}^{Cb} v_{t,j,p}^{Cr})^3], \quad (23b)$$

for a total of 22 terms.

Let $$\bar{s}_{t,j,p} = \begin{bmatrix} s_{t,j,p}^{Cb} \\ s_{t,j,p}^{Cr} \end{bmatrix}, \quad (24)$$

denote the two chroma channels values of the corresponding SDR reference (104) pixel.

Let $$\tilde{c}_{t,j,p} = \begin{bmatrix} c_{t,j,p}^{Cb} \\ c_{t,j,p}^{Cr} \end{bmatrix}, \quad (25)$$

denote the predicted chroma values based on the three input EDR channels. In an embodiment, given an MMR model, the goal is to determine a set of MMR coefficients $M_{t,j}^F$, such that the predicted SDR value, $\tilde{c}_{t,j,p}$, is closest to $\bar{s}_{t,j,p}$ according to some optimization criterion, such as optimizing the mean square error (MSE).

For a picture with P chroma pixels, one can construct matrices, let $$\overline{U}_{t,j} = \begin{bmatrix} \overline{u}_{t,j,0}^T \\ \overline{u}_{t,j,1}^T \\ \vdots \\ \overline{u}_{t,j,P-1}^T \end{bmatrix} \text{ and } \overline{S}_{t,j} = \begin{bmatrix} \bar{s}_{t,j,0}^T \\ \bar{s}_{t,j,1}^T \\ \vdots \\ \bar{s}_{t,j,P-1}^T \end{bmatrix}. \quad (26)$$

Then, the predicted chroma matrix may be given by $$\tilde{C}_{t,j} = \begin{bmatrix} \tilde{c}_{t,j,0}^T \\ \tilde{c}_{t,j,1}^T \\ \vdots \\ \tilde{c}_{t,j,P-1}^T \end{bmatrix} = \overline{U}_{t,j} M_{t,j}^F. \quad (27)$$

Considering a single frame only (j), the MSE optimization problem may be expressed as:

$$\arg\min_{M_{t,j}^F} \|\overline{S}_{t,j} - \tilde{C}_{t,j}\|^2 = \arg\min_{M_{t,j}^F} \|\overline{S}_{t,j} - \overline{U}_{t,j} M_{t,j}^F\|^2, \quad (28)$$

which yields an optimal chroma forward reshaping function $M^F_{t,j}$ given by $$M_{t,j}^F = (\overline{U}_{t,j}^T \overline{U}_{t,j})^{-1}(\overline{U}_{t,j}^T \overline{S}_{t,j}). \tag{29}$$

As explained earlier, in some embodiments it is preferred to define the reshaping functions at the scene level; then, given segment t with $F_t$ frames, the optimization problem becomes:

$$\underset{M_t^F}{\text{argmin}} \sum_{j=0}^{F_t-1} \|\overline{S}_{t,j} - \tilde{C}_{t,j}\|^2 = \underset{M_t^F}{\text{argmin}} \sum_{j=0}^{F_t-1} \|\overline{S}_{t,j} - \overline{U}_{t,j} M_t^F\|^2, \tag{30}$$

with the solution given by $$\overline{U}_t^T \overline{U}_t = \sum_{j=0}^{F_t-1} \overline{U}_{t,j}^T \overline{U}_{t,j}, \tag{31}$$

$$\overline{U}_t^T \overline{S}_t = \sum_{j=0}^{F_t-1} \overline{U}_{t,j}^T \overline{S}_{t,j},$$

$$M_t^F = (\overline{U}_t^T \overline{U}_t)^{-1}(\overline{U}_t^T \overline{S}_t).$$

In an alternative embodiment, certain frames may be considered to have more weight than others, hence, given weights $w_{t,j,k}$, for k=0, 1, 2, . . . , $F_t$−1, the optimization problem becomes $$\underset{M_{t,j}^F}{\text{argmin}} \sum_{k=0}^{F_t-1} w_{t,j,k} \cdot \|\overline{S}_{t,k} - \tilde{C}_{t,k}\|^2 = \underset{M_{t,j}^F}{\text{argmin}} \sum_{k=0}^{F_t-1} w_{t,j,k} \cdot \|\overline{S}_{t,k} - \overline{U}_{t,k} M_{t,j}^F\|^2, \tag{32}$$

and the solution is given by $$A_{t,j}^F = \sum_{k=0}^{F_t-1} w_{t,j,k} \cdot \overline{U}_{t,k}^T \overline{U}_{t,k}, \tag{33}$$

$$B_{t,j}^F = \sum_{k=0}^{F_t-1} w_{t,j,k} \cdot \overline{U}_{t,k}^T \overline{S}_{t,k},$$

$$M_{t,j}^F = (A_{t,j}^F)^{-1}(B_{t,j}^F).$$

In some embodiments, all $w_{t,j,k}$ weights may be equal (e.g., equal to 1). In other embodiments, the weights may follow a certain distribution function (e.g., exponential, Gaussian, and the like) so that neighboring frames at the center of the sliding window have more weight than frames at the edges of the sliding window.

Non-Overlapping Solution—Backward Reshaping

Let the p-th pixel at the reshaped SDR (107) domain be expressed as $$h_{t,j,p} = \begin{bmatrix} c_{t,j,p}^Y \\ c_{t,j,p}^{Cb} \\ c_{t,j,p}^{Cr} \end{bmatrix}. \tag{34}$$

As before, in an embodiment, on the decoder, a backward chroma reshaping function, based on an MMR model, needs to be determined so that reconstructed EDR pixels are as close as possible to the original EDR pixels.

Similarly to vector $\overline{u}_{t,j,p}$ in equation (23), the vector $\overline{h}_{t,j,p}$ may also be expressed as a combination of first, second, and/or third order terms of $h_{t,j,p}$ according to a backward-reshaping MMR model.

Let $$\overline{q}_{t,j,p} = \begin{bmatrix} v_{t,j,p}^{Cb} \\ v_{t,j,p}^{Cr} \end{bmatrix} \tag{35}$$

denote the two chroma pixel values in the original EDR. Let $$\hat{v}_{t,j,p} = \begin{bmatrix} \hat{v}_{t,j,p}^{Cb} \\ \hat{v}_{t,j,p}^{Cr} \end{bmatrix} \tag{36}$$

denote the predicted chroma values via backward MMR, then, given an MMR model for the backward chroma reshaping, a matrix, $M_{t,j}^B$ of MMR coefficients is defined such that the predicted EDR value, $\hat{v}_{t,j,p}$, is closest to $v_{t,j,p}$ according to some optimization criterion (e.g., minimizing the MSE).

For a picture with P chroma pixels, let:

$$\overline{H}_{t,j} = \begin{bmatrix} \overline{h}_{t,j,0}^T \\ \overline{h}_{t,j,1}^T \\ \vdots \\ \overline{h}_{t,j,P-1}^T \end{bmatrix} \text{ and } \overline{Q}_{t,j} = \begin{bmatrix} \overline{q}_{t,j,0}^T \\ \overline{q}_{t,j,1}^T \\ \vdots \\ \overline{q}_{t,j,P-1}^T \end{bmatrix}. \tag{37}$$

Let the predicted value be $$\hat{V}_{t,j} = \begin{bmatrix} \hat{v}_{t,j,0}^T \\ \hat{v}_{t,j,1}^T \\ \vdots \\ \hat{v}_{t,j,P-1}^T \end{bmatrix} = \overline{H}_{t,j} M_{t,j}^B, \tag{38}$$

then, for the j-th frame, the optimization problem may be expressed as $$\underset{M_{t,j}^B}{\text{argmin}} \|\overline{Q}_{t,j} - \hat{V}_{t,j}\|^2 = \underset{M_{t,j}^B}{\text{argmin}} \|\overline{Q}_{t,j} - \overline{H}_{t,j} M_{t,j}^B\|^2, \tag{39}$$

and the optimal chroma forward reshaping function $M_{t,j}^B$, can be obtained via the least squared solution $$M_{t,j}^B = (\overline{H}_{t,j}^T \overline{H}_{t,j})^{-1}(\overline{H}_{t,j}^T \overline{Q}_{t,j}). \tag{40}$$

As before, a scene-based optimal solution may be given as $$\overline{H}_t^T \overline{H}_t = \sum_{j=0}^{F_t-1} \overline{H}_{t,j}^T \overline{H}_{t,j}, \qquad (41)$$

$$\overline{H}_t^T \overline{Q}_t = \sum_{j=0}^{F_t-1} \overline{H}_{t,j}^T \overline{Q}_{t,j},$$

$$M_t^B = (\overline{H}_t^T \overline{H}_t)^{-1}(\overline{H}_t^T \overline{Q}_t),$$

and a segment-based solution may be derived as $$A_{t,j}^B = \sum_{k=0}^{F_t-1} w_{t,j,k} \cdot \overline{H}_{t,k}^T \overline{H}_{t,k} \qquad (42)$$

$$B_{t,j}^B = \sum_{k=0}^{F_t-1} w_{t,j,k} \cdot \overline{H}_{t,k}^T \overline{Q}_{t,j}$$

$$M_{t,j}^B = (A_{t,j}^B)^{-1}(B_{t,j}^B).$$

Forward and Backward Reshaping with Overlapped Segments

When segments are padded, additional frames from neighboring segments are used in a sliding window. Denote the sliding window size for forward and backward reshaping as $2W^F+1$ and $2W^B+1$, respectively, where $W^B \leq W^F$. Consider segment t. For the j-th frame (e.g., F in FIG. 3) in the set of primary frames (e.g. (304) to (306)) in the segment, let $f_{SCl}$ denote the frame for the first scene cut to its left and let $f_{SCr}$ denote the frame for the first scene cut to its right. Let $(f_{P,t}^b, f_{P,t}^e)$ denote the first and last frames of the extended (padded) segment t (e.g., between frames (302) and (308)), then the support frame set for forward chroma reshaping is given by:

$$\Phi_{t,j}^F = \{W_{t,j}^{F,b}, W_{t,j}^{F,b}+1, W_{t,j}^{F,b}+2, \ldots, W_{t,j}^{F,e}-2, W_{t,j}^{F,e}-1, W_{t,j}^{F,e}\},$$

where $$W_{t,j}^{F,b} = \max\{f_{P,t}^b, j - W^F f_{SCl}\},$$

and $$W_{t,j}^{F,e} = \min\{j + W^F f_{SCr} - 1, f_{P,t}^e\}. \qquad (43)$$

NOTE: To perform the overlapped forward reshaping, an extra $2W^F$ frames from the EDR and reference SDR of the previous (t−1) segment are required, given by $$\{\overline{S}_{t-1,F_{t-1}-1}, \overline{S}_{t-1,F_{t-1}-2}, \overline{S}_{t-1,F_{t-1}-3}, \ldots, \overline{S}_{t-1,F_{t-1}-W^F}\},$$

$$\{\overline{U}_{t-1,F_{t-1}-1}, \overline{U}_{t-1,F_{t-1}-2}, \overline{U}_{t-1,F_{t-1}-3}, \ldots, \overline{U}_{t-1,F_{t-1}-W^F}\}, \qquad (44)$$

Similarly, $2W^F$ additional frames at the next segment (t+1) are required, given by $$\{\overline{S}_{t+1,0}, \overline{S}_{t+1,1}, \overline{S}_{t+1,2}, \ldots, \overline{S}_{t+1,W^F-1}\},$$

$$\{\overline{U}_{t+1,0}, \overline{U}_{t+1,1}, \overline{U}_{t+1,2}, \ldots, \overline{U}_{t+1,W^F-1}\}. \qquad (45)$$

As explained before, using weighted optimization, the optimized forward MMR set of coefficients may be derived as:

$$A_{t,j}^F = \sum_{k \in \Phi_{t,j}^F} w_{t,j,k} \cdot \overline{U}_{t,k}^T \overline{U}_{t,k}, \qquad (46)$$

$$B_{t,j}^F = \sum_{k \in \Phi_{t,j}^F} w_{t,j,k} \cdot \overline{U}_{t,k}^T \overline{S}_{t,k},$$

$$M_{t,j}^F = (A_{t,j}^F)^{-1}(B_{t,j}^F).$$

In backward or inverse reshaping, an extra $W^B$ frames are required from the reshaped SDR, given by $$\{\tilde{C}_{t-1,F_{t-1}-1}, \tilde{C}_{t-1,F_{t-1}-2}, \tilde{C}_{t-1,F_{t-1}-3}, \ldots, \tilde{C}_{t-1,F_{t-1}-W^B}\}, \qquad (47)$$

and extra smoothed $W^B$ frames at the next segment are required, given by, $$\{\tilde{C}_{t+1,0}, \tilde{C}_{t+1,1}, \tilde{C}_{t+1,2}, \ldots, \tilde{C}_{t+1,W^B-1}\}. \qquad (48)$$

Then the support set for backward reshaping is $$\Phi_{t,j}^B = \{W_{t,j}^{B,b}, W_{t,j}^{B,b}+1, W_{t,j}^{B,b}+2, \ldots, W_{t,j}^{B,e}-2, W_{t,j}^{B,e}-1, W_{t,j}^{B,e}\},$$

where $$W_{t,j}^{B,b} = \max\{f_{P,t}^b, j - W^B f_{SCl}\},$$

and $$W_{t,j}^{B,e} = \min\{j + W^B f_{SCr} - 1, f_{P,t}^e\}. \qquad (49)$$

Using weighted optimization, the backward MMR solution is given by $$A_{t,j}^B = \sum_{k \in \Phi_{t,j}^B} w_{t,j,k} \cdot \overline{H}_{t,k}^T \overline{H}_{t,k}, \qquad (50)$$

$$B_{t,j}^F = \sum_{k \in \Phi_{t,j}^B} w_{t,j,k} \cdot \overline{H}_{t,k}^T \overline{Q}_{t,k},$$

$$M_{t,j}^B = (A_{t,j}^B)^{-1}(B_{t,j}^B).$$

Figure 5A:
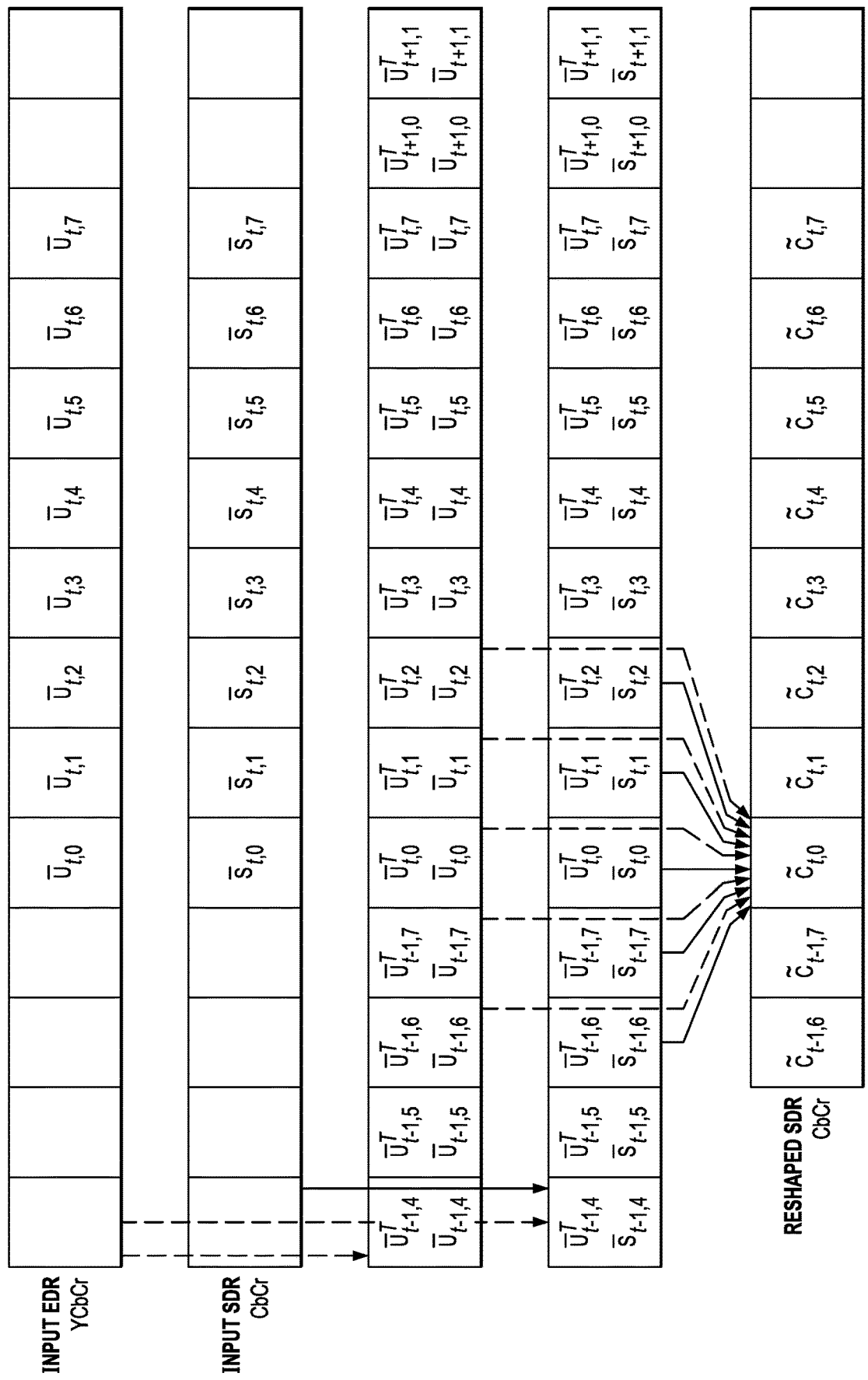
FIG. 5A depicts a process of overlapped forward chroma reshaping in an HDR encoder according to an embodiment of this invention.

FIG. 5A depicts a process of overlapped forward chroma reshaping in an EDR/HDR encoder according to an embodiment of this invention. Given input YCbCr EDR data $\overline{U}_t$ and input SDR data $\overline{S}_t$, for a given forward MMR model, (say, a 2d order or a 3d order), a forward prediction parameter matrix ($M_{t,j}^F$) may be generated according to an MSE optimization criterion (e.g., equation (46)). Then, the chroma values of the reshaped SDR signal (e.g., 107) may be generated using equation (27), that is $$\tilde{C}_{t,j} = \overline{U}_{t,j} M_{t,j}^F. \qquad (51)$$

Figure 5B:
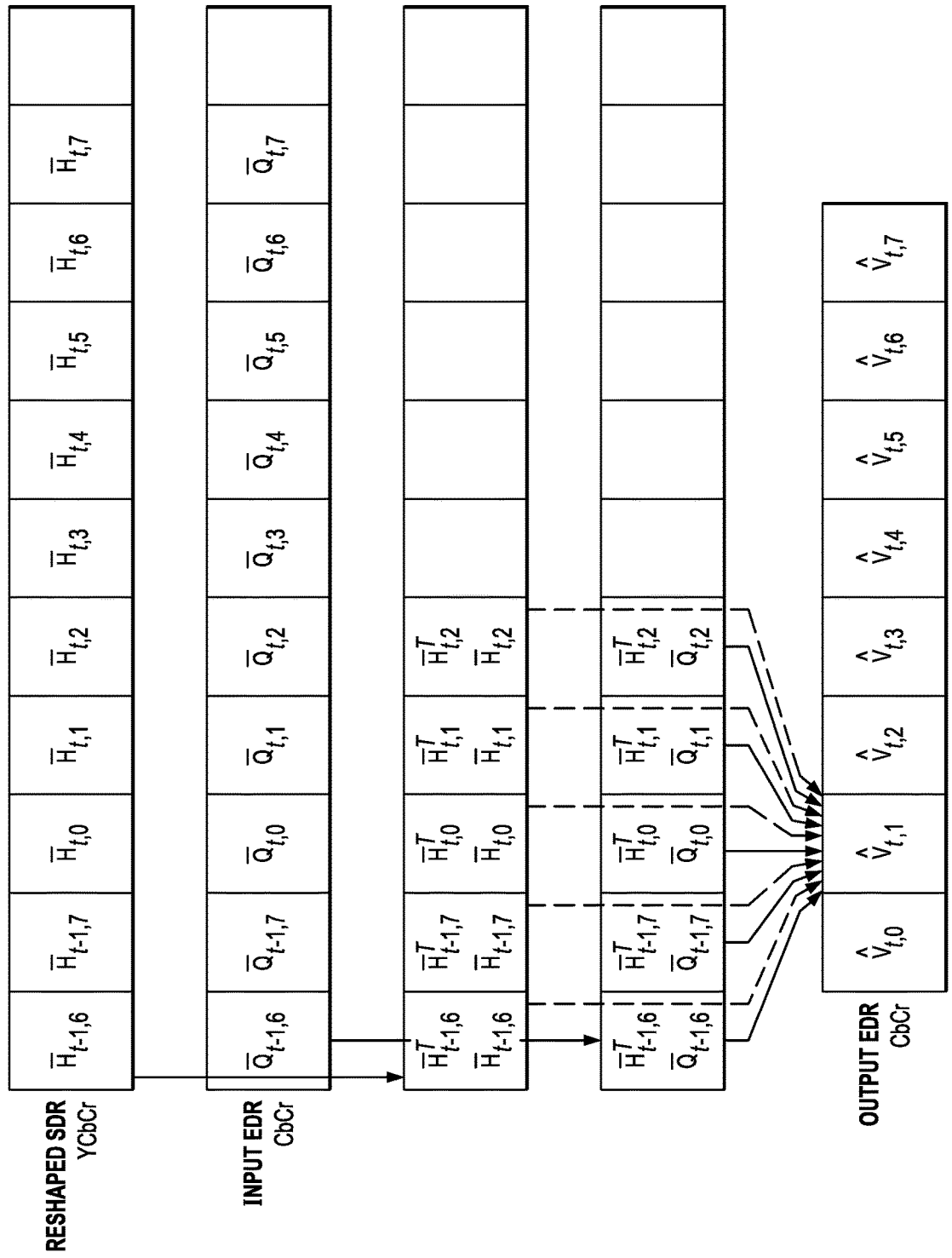
FIG. 5B depicts a process of overlapped backward chroma reshaping in an HDR decoder to an embodiment of this invention.

FIG. 5B depicts a process of overlapped backward chroma reshaping in an EDR/HDR encoder according to an embodiment of this invention. Given input CbCr EDR data $\overline{Q}_t$ and input YCbCr SDR data $\overline{H}_t$, for a given backward MMR model, (say, a 2d order or a 3d order), a backward prediction parameter matrix ($M_{t,j}^B$) may be generated according to an MSE optimization criterion (e.g., equation (50)). Then, the reconstructed chroma values of the output EDR signal (e.g., 122_C) may be generated using equation (38), that is $$\hat{V}_{t,j} = \overline{H}_{t,j} M_{t,j}^B. \qquad (52)$$

The order of the MMR backward model and the backward prediction parameter matrix ($M_{t,j}^B$) may be communicated to a decoder using metadata together with the encoded reshaped SDR signal (107).

Figure 6:
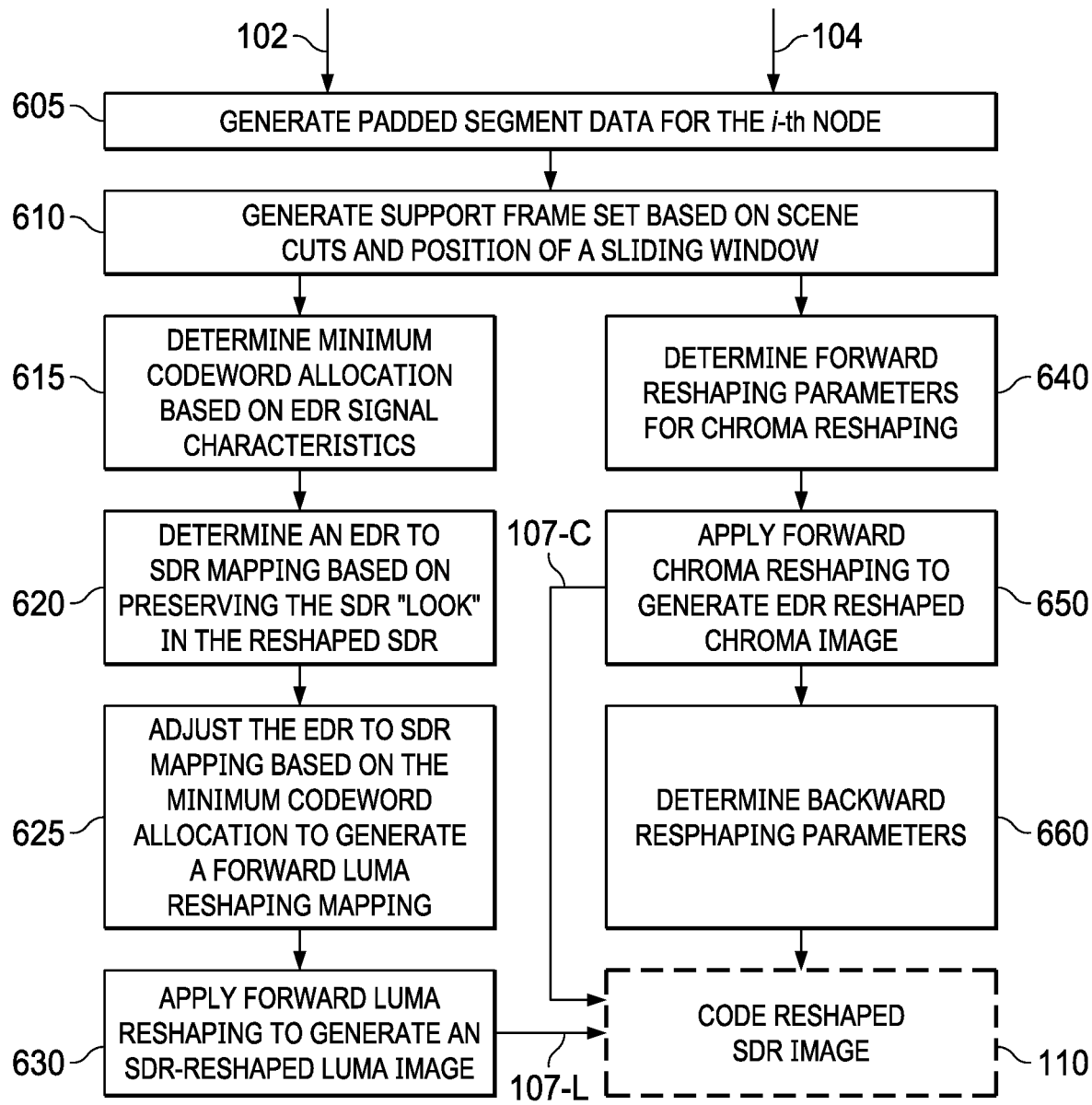
FIG. 6 depicts an example of a process for segment-based luma and chroma reshaping according to an embodiment of this invention.

FIG. 6 summarizes the process for segment-based luma and chroma reshaping according to an example embodiment of this invention. As depicted in FIG. 6, given the reference EDR (102) and SDR (104) inputs, in step (605), the input streams are sub-divided into segments for each computing node. Each node receives extended or padded data (to also be processed by neighboring segments) (e.g., see FIG. 3) to improve the generation of statistical data and reduce the effects from scene changes. A reshaping function for each frame in a segment is computed based on the statistical data available in a support frame set bounded by a 2 W+1 frames-long sliding window centered on the frame. In step (610), the borders of this window are adjusted based on the scene cuts within the segment to generate the support frame set (e.g., see FIG. 3 and equations (1) and (2)).

For luma reshaping, given the support frame set, given a measure of the noise characteristics for each frame, the input and target bit depths, and a masking noise to bit-depth function, step (615) determines the minimum amount of codewords for each bin in the input image (e.g., see equation (11)). In step (620), one may also determine an EDR to reshaped SDR mapping which preserves the "look" of the reference SDR in the reshaped SDR image. For example, and without limitation, such a mapping may be based on matching either the histograms or the CDFs of the input SDR and EDR images. In step (625), the results from steps (615) and (620) are combined so that the look is preserved while the reshaping meets the codeword allocation required to mask the quantization noise due to reshaping.

Given the final forward luma reshaping LUT, step (630) generates the reshaped luma image (107-L). In some embodiments, this step may also generate an inverse luma-reshaping function based on the forward luma reshaping LUT to be communicated downstream to the receiver (e.g., as a piecewise linear or non-linear function). Examples of these steps can be found in References [4] and [5].

For chroma reshaping, in an embodiment, step (640), may apply a forward MMR prediction model and a forward support frame set to generate, according to an optimizing criterion, the forward chroma reshaping parameters (e.g., see equation (46)), to be used in step (650) to generate the chroma components (107-C) of the reshaped SDR signal (107). Step (660) may use a backward MMR model and a backward support frame set to generate the backward reshaping parameters (e.g., using equation (42)), which are communicated to the downstream receiver using metadata. The reshaped SDR signal (107), together with metadata related to the backward or inverse luma and chroma reshaping functions may be passed to an encoder (110) for further processing.

Linear Broadcasting

A special case of interest is the encoding of video signals in linear broadcasting where video is encoded and delivered to the users in real time. In an embodiment, in linear broadcasting, the number of segments is set to one.

Each of the following references is incorporated herein by reference in its entirety.

REFERENCES

[1] ITU-R BT. 1886, "Reference electro-optical transfer function for flat panel displays used in HDTV studio production," ITU, March 2011.
[2] SMPTE ST 2084:2014 "High Dynamic Range EOTF of Mastering Reference Displays," SMPTE, 2014.
[3] U.S. Pat. No. 8,811,490, "Multiple color channel multiple regression predictor," by G-M. Su, et al., 2014.
[4] PCT Application Ser. No. PCT/US2016/020230, "Content-adaptive perceptual quantizer for high dynamic range images," by J. Froehlich et al., filed Mar. 1, 2016.
[5] U.S. Provisional Patent Application Ser. No. 62/334,099, "Block-based content-adaptive reshaping for high dynamic range images," by A. Kheradmand, et al., filed on May 10, 2016. Published also as U.S. Patent Application Pub. US 2017/0221189.
[6] U.S. Provisional Patent Application Ser. No. 62/356,087, "Efficient Histogram-Based Luma Look Matching," by H. Kadu and G-M. Su, filed on Jun. 29, 2016, now PCT Application PCT/US2017/039839, filed on Jun. 28, 2017.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions related to segment-based luma and chroma reshaping of images with enhanced dynamic range, such as those described herein. The computer and/or IC may compute any of a variety of parameters or values that relate to the reshaping processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to segment-based luma and/or chroma reshaping of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to the efficient segment-based luma and/or chroma reshaping of HDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for segment-based signal reshaping with a processor, the method comprising:
   receiving a first input video signal in a first dynamic range and a second input video signal in a second dynamic range, wherein corresponding frames in the first input video signal and the second input video signal represent the same image, wherein the first dynamic range is higher than the second dynamic range;
   dividing the first input video signal and the second input video signal into segments, wherein a segment comprises primary frames and padded frames, wherein the padded frames comprise frames adjacent to the primary frames and belonging to a prior or subsequent segment to the segment;
   for a primary frame in a segment of the first input video signal:
      computing a support frame set based on a sliding window centered on the primary frame and comprising one or more primary frames and one or more padded frames, wherein the support frame set is obtained by adjusting the sliding window based on scene cuts in the segment;
      determining a minimum codeword allocation for luminance pixel values in a reshaped frame of the primary frame based on the first dynamic range, the second dynamic range, and the support frame set;
      determining a first mapping for mapping luminance values of the primary frame from the first dynamic range to the second dynamic range by matching histogram characteristics of luminance values between the primary frame and a frame in the second input video signal corresponding to the primary frame;
      generating a forward luma reshaping mapping by reallocating codewords in the first mapping based on the minimum codeword allocation;
      applying the forward luma reshaping mapping to the primary frame to generate a reshaped primary frame; and
      generating a coded bitstream based on the reshaped primary frame.

2. The method of claim 1, wherein the support frame set is adjusted to exclude frames of the sliding window that are not in the same scene as the primary frame.

3. The method of claim 1, wherein the minimum codeword allocation is determined based on a noise masking threshold for the primary frame.

4. The method of claim 3, wherein the noise masking threshold is determined based on noises measurements for the frames of the support frame set.

5. The method of claim 1, wherein the minimum codeword allocation indicates a lower bound on an allocation of output codewords in the reshaped frame across input codewords in the primary frame.

6. The method of claim 1, wherein computing the support frame set comprises:
   determining a window of 2 W+1 frames centered on the primary frame;
   determining a first scene cut in the segment nearest to the left of the primary frame;
   determining a second scene cut in the segment nearest to the right of the primary frame;
   adjusting the left side of the window to be the beginning of the first scene cut in the segment, if the position of the first scene cut is within W frames to the left of the primary frame; and
   adjusting the right side of the window to be the frame before the position of the second scene cut in the segment, if the position of the second scene cut is within W frames to the right of the primary frame, where W is an integer.

7. The method of claim 1, wherein determining the minimum codeword allocation comprises:
   partitioning the luminance range of the primary frame into non-overlapping bins;
   generating noise estimates for each bin based on a noise measuring criterion and the support frame set; and
   generating the minimum codeword allocation based on the input bit depth of the first input video signal in the first dynamic range, a target bit depth for the reshaped frame in the second dynamic range, and a function for mapping noise estimates to bit depths.

8. The method of claim 1, wherein determining the first mapping for mapping luminance values of the primary frame from the first dynamic range to the second dynamic range based on a second reshaping method comprises:
   computing a first normalized luminance histogram for each frame in the support frame set;
   computing a first cumulative density function, CDF, for the primary frame based on the first normalized luminance histograms;
   computing a second normalized luminance histogram for each frame in the second input video signal that corresponds to a frame in the support frame set;
   computing a second CDF based on the second normalized luminance histograms; and
   for each luma intensity value in the primary frame determining a first mapped luma value such that an output value of the first CDF for the luma intensity value is approximately equal to the output value of the second CDF for the first mapped luma value.

9. The method of claim 1, wherein reallocating codewords of the first mapping further comprises:
   generating, as delta values, pair-wise differences between mapped codewords of consecutive codewords, the consecutive codewords being mapped by the first mapping;
   identifying a first set of elements of the delta values which violate the minimum codeword allocation;
   determining a first metric ($\alpha$) of codeword requirements to be added for the first set of elements, the first metric indicating an additional amount of required codewords for satisfying the minimum codeword allocation;
   identifying a second set of elements of the delta values which do not violate the minimum codeword allocation;
   determining a second metric ($\beta$) of codeword requirements to be subtracted for the second set of elements, the second metric of codeword requirements indicating a sum of those delta values that do not violate the minimum codeword allocation;

for the first set of elements, generating a first set of updated values by replacing their delta values with their corresponding minimum codeword allocation values;

for the second set of elements, generating a second set of updated values by rescaling their delta values based on the first metric and the second metric; and generating a forward reshaping LUT based on the first set of updated values and the second set of updated values.

10. The method of claim 9, wherein rescaling comprises multiplying each original delta value in the second set of elements by $$\left(1 - \frac{\alpha}{\beta}\right).$$

11. The method of claim 1, further comprising:
determining forward luma reshaping mappings for two or more frames in the support frame set of the primary frame; and
determining an average forward luma reshaping mapping based on an average or weighted average of the forward luma reshaping mappings for the two or more frames in the support frame set of the primary frame.

12. The method of claim 11, further comprising:
applying the forward luma reshaping mapping or the average forward luma reshaping mapping for the primary frame to luminance pixel values of the primary frame to generate luminance values of an output reshaped frame.

13. The method of claim 12, further comprising:
determining a set of reshaping chroma parameters for forward chroma reshaping based on a forward multivariate, multi-regression (MMR) model and a support frame set for forward chroma reshaping, by minimizing the MSE error between chroma values in an output reshaped frame and chroma values in a frame of the second input video signal corresponding to the primary frame.

14. The method of claim 12, further comprising determining a set of reshaping chroma parameters for backward chroma reshaping based on a backward MMR model and a support frame set for backward chroma reshaping, by minimizing the MSE error between chroma values in a reconstructed output image in the first dynamic range and chroma values in the primary frame of the first input video signal.

15. The method of claim 13, wherein the MSE error is weighted MSE.

16. The method of claim 13, further comprising applying the forward MMR model to the primary frame to generate chrominance values of the output reshaped frame.

17. An apparatus comprising a processor and configured to perform the method of claim 1.

18. A non-transitory computer-readable storage medium having stored thereon computer-executable instruction for executing a method in accordance with claim 1.

* * * * *